United States Patent
Gupta et al.

(10) Patent No.: US 7,984,141 B2
(45) Date of Patent: Jul. 19, 2011

(54) INDEPENDENT LOAD BALANCING FOR SERVERS

(75) Inventors: Shishir Gupta, Cary, NC (US); Gary Harris, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 371 days.

(21) Appl. No.: 11/778,249

(22) Filed: Jul. 16, 2007

(65) Prior Publication Data

US 2009/0023455 A1     Jan. 22, 2009

(51) Int. Cl.
*G06F 15/173* (2006.01)

(52) U.S. Cl. ........ 709/224; 370/229; 370/232; 709/203; 709/226; 709/227; 709/232; 709/237; 709/239; 709/248; 714/41

(58) Field of Classification Search .................... 709/224
See application file for complete search history.

(56) References Cited

U.S. PATENT DOCUMENTS

| | | | | |
|---|---|---|---|---|
| 5,095,444 | A * | 3/1992 | Motles | 709/224 |
| 5,193,151 | A * | 3/1993 | Jain | 709/237 |
| 6,073,176 | A | 6/2000 | Baindur et al. | |
| 6,148,335 | A * | 11/2000 | Haggard et al. | 709/224 |
| 7,069,325 | B1 * | 6/2006 | Lu et al. | 709/226 |
| 7,228,358 | B1 * | 6/2007 | McManus | 709/239 |
| 7,266,730 | B2 * | 9/2007 | Umeda | 714/41 |
| 7,313,635 | B1 * | 12/2007 | Zavalkovsky | 709/248 |
| 7,454,457 | B1 * | 11/2008 | Lowery et al. | 709/203 |
| 2006/0031521 | A1 * | 2/2006 | Wilk | 709/227 |
| 2006/0168202 | A1 * | 7/2006 | Reshef et al. | 709/224 |
| 2007/0263538 | A1 * | 11/2007 | Hueck et al. | 370/232 |

OTHER PUBLICATIONS

Cisco Systems Inc., Multichassis Multilink PPP (MMP), technologies_tech_note09186a008009408f.shtml, May 12, 2006, Volume www.cisco.com/en/US/, No. tech/tk713/tk507/, Publisher: Cisco Systems, Inc., Published in: San Jose, CA and Internet.

Cisco Systems, Inc., IOS Server Load Balancing, ps1833/products_feature_guide09186a0080086f2b.html#wp2728057, Dec. 26, 2002, Volume www.cisco.com/en/US/, Number products/sw/iosswrel, Publisher: Cisco Systems, Inc., Published in: San Jose, CA and Internet.

* cited by examiner

*Primary Examiner* — Aaron Strange
*Assistant Examiner* — Tobias J Casaw
(74) *Attorney, Agent, or Firm* — Patent Capital Group

(57) ABSTRACT

In one embodiment, a method includes receiving a request message at a local node in a communications network from a remote node in the communication network. The request message holds data that indicates a request for a particular service from the local node. A load metric that indicates a current processing load at the local node is determined. A response delay time, for responding to the request message, is determined based on the load metric. A response message is sent after the response delay time. The response message indicates the local node is able to provide the particular service for the remote node. The delay time allows the local node to make it more likely that a less busy node will respond earlier in time to a request message from the same remote node and provide the particular service.

20 Claims, 5 Drawing Sheets

INDEPENDENT LOAD BALANCING FOR SERVERS

BACKGROUND OF THE INVENTION

1. Field of the Invention

The present invention relates to load balancing for servers in a communications network, and in particular load balancing for Point-to-Point over Ethernet (PPPoE) servers.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

A network service provider (SP) often brings network service right to the premises of its subscribers, also called users and customers herein. Several user sites are connected by telephone wire, cable or wireless transmission media to user-facing provider edge intermediate network nodes (u-PE nodes) that are located close to user sites. Several u-PE nodes are connected over an aggregation network to fewer, more powerful network-facing provider edge intermediate network nodes (n-PE nodes) that provide a point of presence on the destination network. For example, when user premises end nodes are connected to the SP equipment through a digital subscriber loop (DSL) modem, those modems communicate with a u-PEs called a DSL access module (DSLAM). Several DSLAM are connected over an aggregation network to an n-PEs called a broadband remote access server (BRAS). In a typical configuration, the end nodes communicate with the BRAS using a Point-to-Point Protocol (PPP) over Ethernet protocol (PPPoE). A DSLAM is designed to handle about a thousand communication sessions, where a session is an exchange of data packets between the same user and BRAS. A BRAS host is designed to handle much larger session loads, e.g., multiples of 32,000 sessions.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
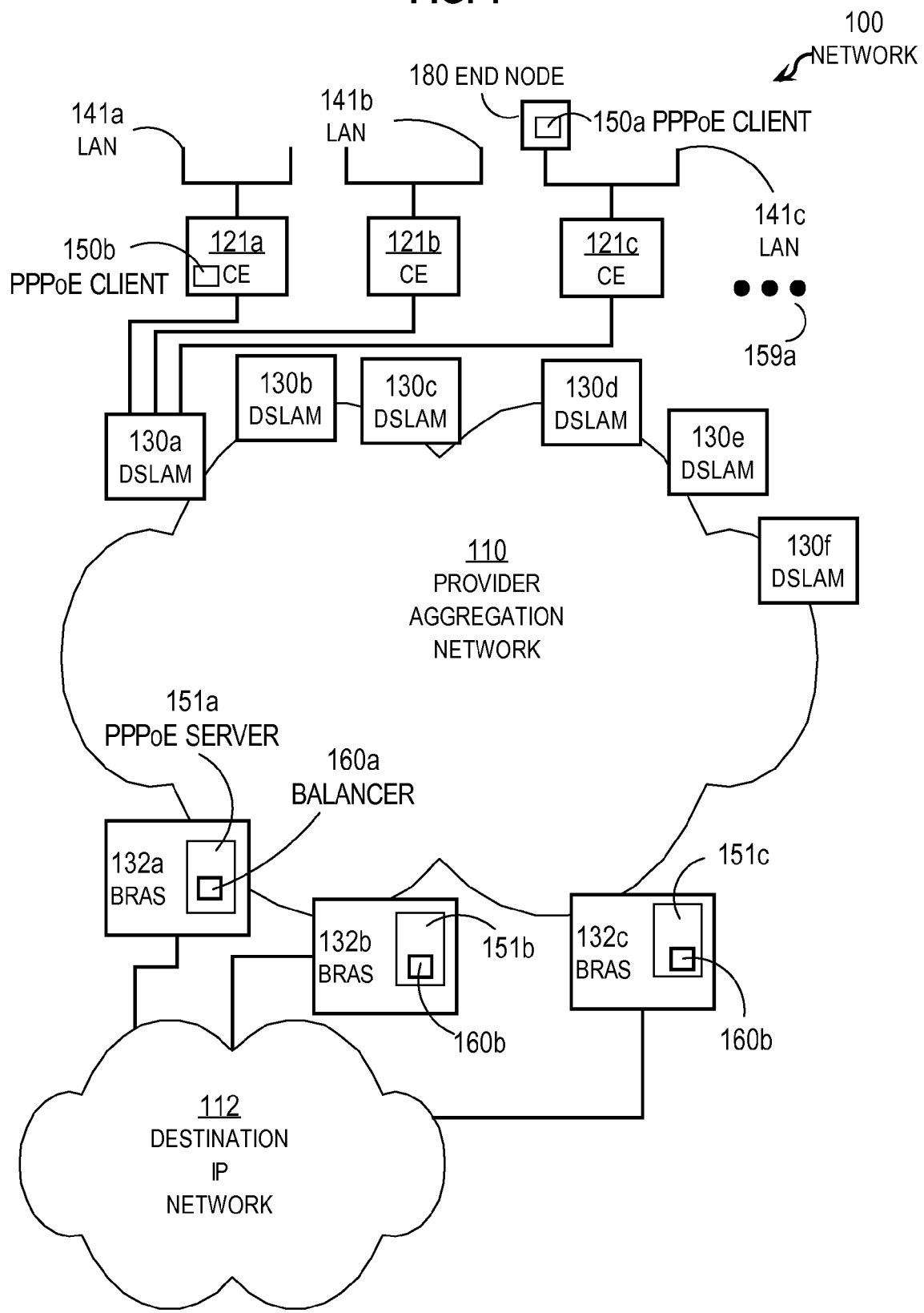
FIG. 1 illustrates an example network with DSLAM and BRAS.

Techniques are described for load balancing among multiple servers. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of PPPoE servers on multiple BRAS hosts balancing a load of PPPoE sessions with end nodes on customer sites without changes by an intervening intermediate node or negotiations with adjacent BRAS hosts. However, the invention is not limited to this context. In other embodiments, servers for other types of services, such as dynamic host configuration protocol (DHCP) servers and web page servers and video servers, load balance responses to requests from clients among multiple servers without changes from an intervening intermediate node or negotiations with other servers.

1.0 Overview

In one set of embodiments, a method includes receiving a request message at a local node in a communications network from a remote node in the communication network. The request message holds data that indicates a request for a particular service from the local node. A load metric that indicates a current processing load at the local node is determined. A response delay time is determined based on the load metric. A response message is sent after the response delay time. The response message indicates the local node is able to provide the particular service for the remote node.

In other sets of embodiments, an apparatus or logic encoded in a tangible medium is configured to perform one or more steps of the above method.

2.0 Network Overview

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. The header includes information such as the source of the packet, its destination, the length of the payload, or other properties used by the protocol. Often, the data in the payload for the particular protocol includes a header and payload for a different protocol associated with a different layer of detail for information exchange.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are intermediate network nodes that determine which communication link or links to employ to support the progress of data packets through the network. An intermediate network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

The Point-to-Point Protocol (PPP) provides a standard method for transporting any of multiple protocol data packets (also called frames, datagrams and cells, and used interchangeably herein) over point-to-point links. PPP is defined in an Internet Engineering Task Force (IETF) request for comments document (RFC) numbered 1661, dated July 1994. Copies of RFC 1661 and other RFCs cited below are available at the World Wide Web domain ietf.org. PPP has been used extensively to connect users at a home site to a remote network using modems and telephone copper loop infrastructure. PPP provides a robust control plane for signaling line characteristics, network protocol parameters, and user-level authentication. In large service provider networks, the user authentication models are generally well entrenched, including, but not limited to, custom-built applications for communicating policy to network equipment and to track billing information.

For applications in which multiple hosts on a shared Ethernet establish PPP sessions to multiple destinations via one or more bridging modems, a PPP over Ethernet (PPPoE) specification has been developed. PPPoE is intended to be used with broadband remote access technologies that provide a bridged Ethernet topology in an aggregation network, when access providers wish to distinguish different users connected via the same modem to the remote network. PPP provides this distinction by opening different sessions with different users. PPPoE is described in IETF RFC 2516.

PPPoE sessions are established according to the client-server model of network communications widely known and used. According to the client-server model, a client process sends a message including a request to a server process, and the server process responds by providing a service. The server process usually returns a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

FIG. 1 illustrates an example network 100 with DSLAM and BRAS. Network 100 includes local area network (LAN) 141a, LAN 141b, LAN 141c (collectively referenced hereinafter as LAN 141) and a destination Internet Protocol (IP) network 112. Each LAN 141 includes one or more end nodes, such as end node 180 and others (not shown), connected to each other by communication links. Network 100 includes customer edge intermediate network node (CE node) 121b, CE node 121b, CE node 121c (collectively referenced hereinafter as CE nodes 121), DSLAM 130a, DSLAM 130b, DSLAM 130c, DSLAM 130d, DSLAM 130e, and DSLAM 130f (collectively referenced hereinafter as DSLAM 130), SP aggregation network 110, and BRAS host 132a, BRAS host 132b, BRAS host 132c (collectively referenced hereinafter as BRAS 132).

For purposes of illustration, it is assumed that each LAN 141 is located at a different customer site. Each LAN 141 is connected to a CE node; LAN 141a, LAN 141b, LAN 141c are connected to CE node 121b, CE node 121b, CE node 121c, respectively. CE nodes 121 are connected directly or indirectly to service provider (SP) equipment including the DSLAM 130. In the illustrated embodiments, CE node 121a, CE node 121b, CE node 121c and others represented by ellipsis 159 are connected to DSLAM 130a. Each DSLAM 130 is connected to one or more BRAS 132 over SP aggregation network 110. The BRAS 132 are connected to destination IP network 112 and thus constitute a SP point of presence on destination IP network 112.

In the illustrated embodiment, access from an end node (e.g., end node 180) on a LAN 141 (e.g., LAN 141c) to destination IP network 112 is accomplished using a PPPoE client executing on an end node or CE node. For example, in the illustrated embodiment, end node 180 executes PPPoE client 150a and CE node 121a executes PPPoE client 150b. The client exchanges information with a PPPoE server on a BRAS host. In the illustrated embodiment, the PPPoE server 151a, PPPoE server 151b and PPPoE server 151c (collectively referenced hereinafter as PPPoE servers 151) execute on BRAS host 132a, BRAS host 132b and BRAS host 132c, respectively.

As end nodes session involve more demanding data flows such as video content and voice data, and users deploy ever more devices that initiate sessions such as multiple computers and television set-top boxes and personal digital assistants (PDAs), a BRAS host can become so heavily utilized as to degrade performance or reach their limit of sessions. If another BRAS host is available that is less heavily utilized, it is desirable to direct additional sessions to the less utilized BRAS host, in a process called load balancing.

Some current load balancing processes involve an intervening intermediate network node that apportions session requests among a group of BRAS hosts. A problem with this approach is that the apportionment is based on an assessment made at the intervening node and does not reflect the actual degree of utilization at the BRAS host. Some current load balancing processes involve negotiations among neighboring BRAS hosts with direct communication links. A problem with this approach is that not all less-utilized BRAS hosts are neighbors of the heavily-utilized BRAS host.

According to the illustrated embodiment, a balancer process 160a, balancer process 160b and balancer process 160c (collectively referenced hereinafter as balancer process 160) are included in PPPoE server 151a, PPPoE server 151b and PPPoE server 151c, respectively. The balancer process 160 affects the number of PPPoE sessions accepted by each PPPoE server 151 so that the less heavily utilized BRAS 132 is more likely to establish the next PPPoE session requested by a PPPoE client 150. The balancer process 160 accomplishes this distribution of PPPoE sessions without benefit of changes by an intervening intermediate network node or negotiations among the BRAS 132. According to the illustrated embodiments, the balancer process 160 achieves a desirable distribution of PPPoE sessions among the BRAS 132 by delaying a response to a request for service based on the utilized capacity of the responding BRAS 132.

Although a particular number of end nodes, LANs, CE nodes, DSLAMs and BRAS are depicted in FIG. 1 for purposes of illustration, in other embodiments a network includes more or fewer or the same number of end nodes or LANs or CE nodes or DSLAMs or BRAS or some combination.

Figure 2:
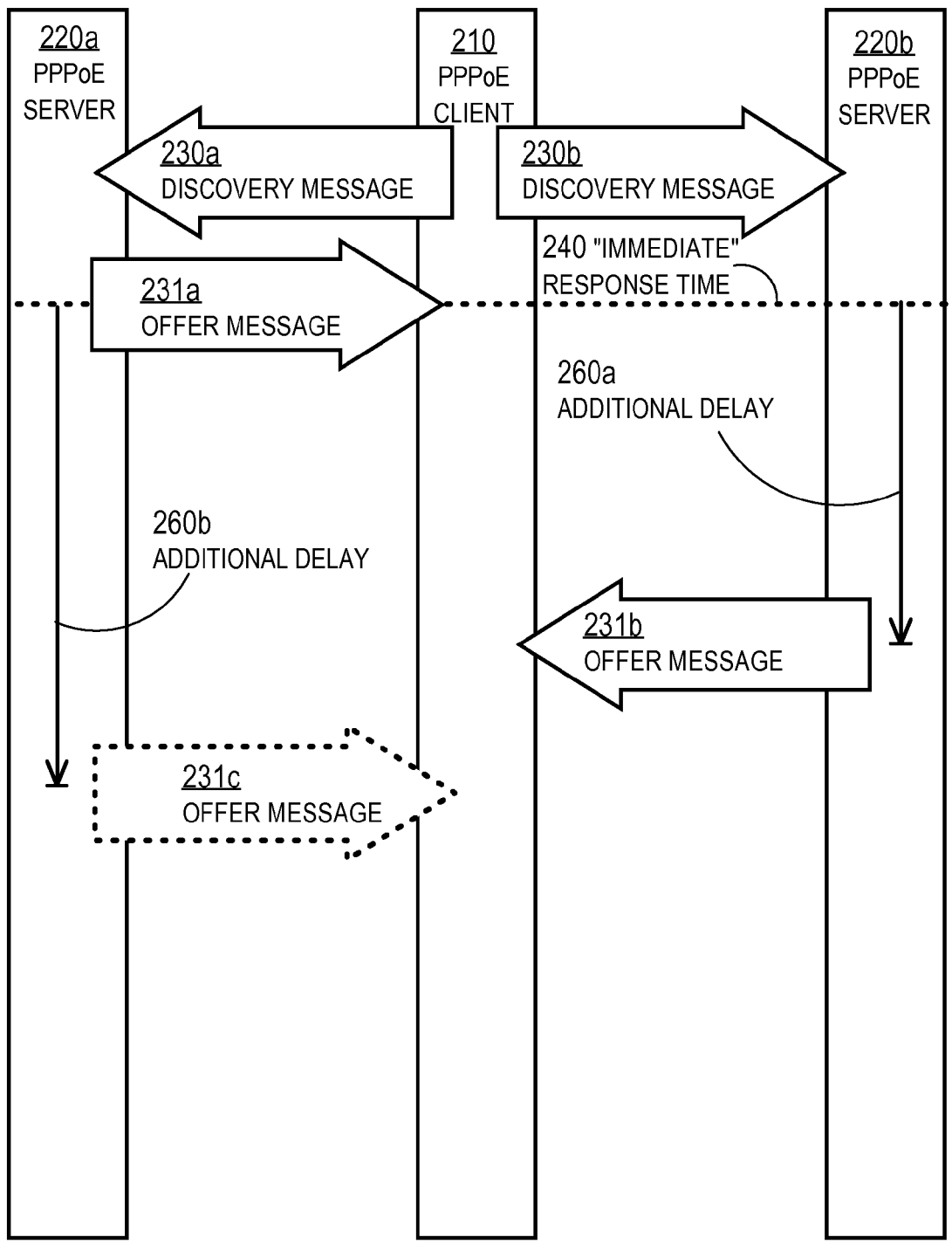
FIG. 2 illustrates an example time sequence of PPPoE control messages.

FIG. 2 illustrates an example time sequence of PPPoE control messages. Time increases downward in this diagram. Each vertical box indicates a process on a different host. A message exchanged over a network at a particular time is represented by a horizontal arrow. FIG. 2 illustrates PPPoE control messages exchanged between a PPPoE client 210 (such as PPPoE client 150a on end node 180) and two PPPoE servers, PPPoE server 220a and PPPoE server 220b (collectively referenced hereinafter as PPPoE servers 220), such as PPPoE server 151a on BRAS host 132a and PPPoE server 151b on BRAS host 132b.

At a first depicted time, the PPPoE client 210 sends out an Ethernet broadcast message that includes a PPPoE discovery message, which is a request for PPPoE service, called a PPPoE Active Discovery Initiation (PADI) message. The broadcast message is propagated by every Ethernet switch in the network (e.g., LAN 141 and aggregation network 110) and reaches all PPPoE servers on the Ethernet network (e.g., PPPoE servers 151). The receipt by multiple PPPoE servers is represented in FIG. 2 by the two depicted discovery messages, discovery message 230a received at PPPoE server 220a and discovery message 230b received at PPPoE server 220b.

The PPPoE standard (RFC 2615) does not indicate a response time for responding to a PPPoE discovery message. In typical PPPoE server operations, in response to receiving a PPPoE discovery message, a PPPoE server substantively immediately sends a response in the form of a PPPoE offer (PPPoE Active Discovery Offer, PADO) message directed to the particular PPPoE client (in a unicast message that is not broadcast on all Ethernet segments in the network). A substantively immediate response is depicted in FIG. 2 as the offer message 231 a sent by PPPoE server 220a. The time of the substantively immediate response is indicated by the horizontal dashed line 240.

When all PPPoE servers respond substantively immediately, the PPPoE client receives several offers within a short time and selects one for starting the PPPoE session, responding with subsequent unicast messages (such as a PPPoE Active Discovery Request, PADR, message, not shown) directed to the PPPoE server that sent the selected offer. Often, the first offer received is the one selected by the PPPoE client. The PPPoE server responds to the PADR with a PPPoE Active Discovery Session-Confirmation (PADS) message (not shown).

In the illustrated embodiments, each PPPoE server responds to a PADI message in a time related to how busy its host is. The busier the host, the longer the server waits to respond. This increases the chances that the server on another host will provide the service.

It is assumed for purposes of illustration that the host for PPPoE server 220a is at about 5% of capacity and that the host for PPPoE server 220b is at about 50% of its capacity. Therefore, PPPoE sever 220a does not delay its response, whereas PPPoE server 220b delays its response by a few milliseconds. This delay is indicated in FIG. 2 by PPPoE server 220b sending its unicast offer message 231b to client 210 after the additional delay 260a past the substantially immediate response. Because the offer message 231b is received so long after offer message 231a, it is likely that client 210 already responded to the earlier offer message 231 a and establishes a PPPoE session with the host of PPPoE server 220a.

If it is instead assumed that PPPoE server were not at 5% of capacity but instead were at 70% of capacity, then its offer message would be offer message 231c sent after additional delay 260b. In this circumstance, the offer message 231c is received so long after offer message 231b that it is likely that client 210 already responded to the earlier offer message 231b and establishes a PPPoE session with the host of PPPoE server 220b.

According to such embodiments, several PPPoE severs fairly distribute the load of servicing PPPoE sessions with multiple PPPoE clients, without direct negotiation or the requirement that an intervening node intercede.

3.0 Method

Figure 3:
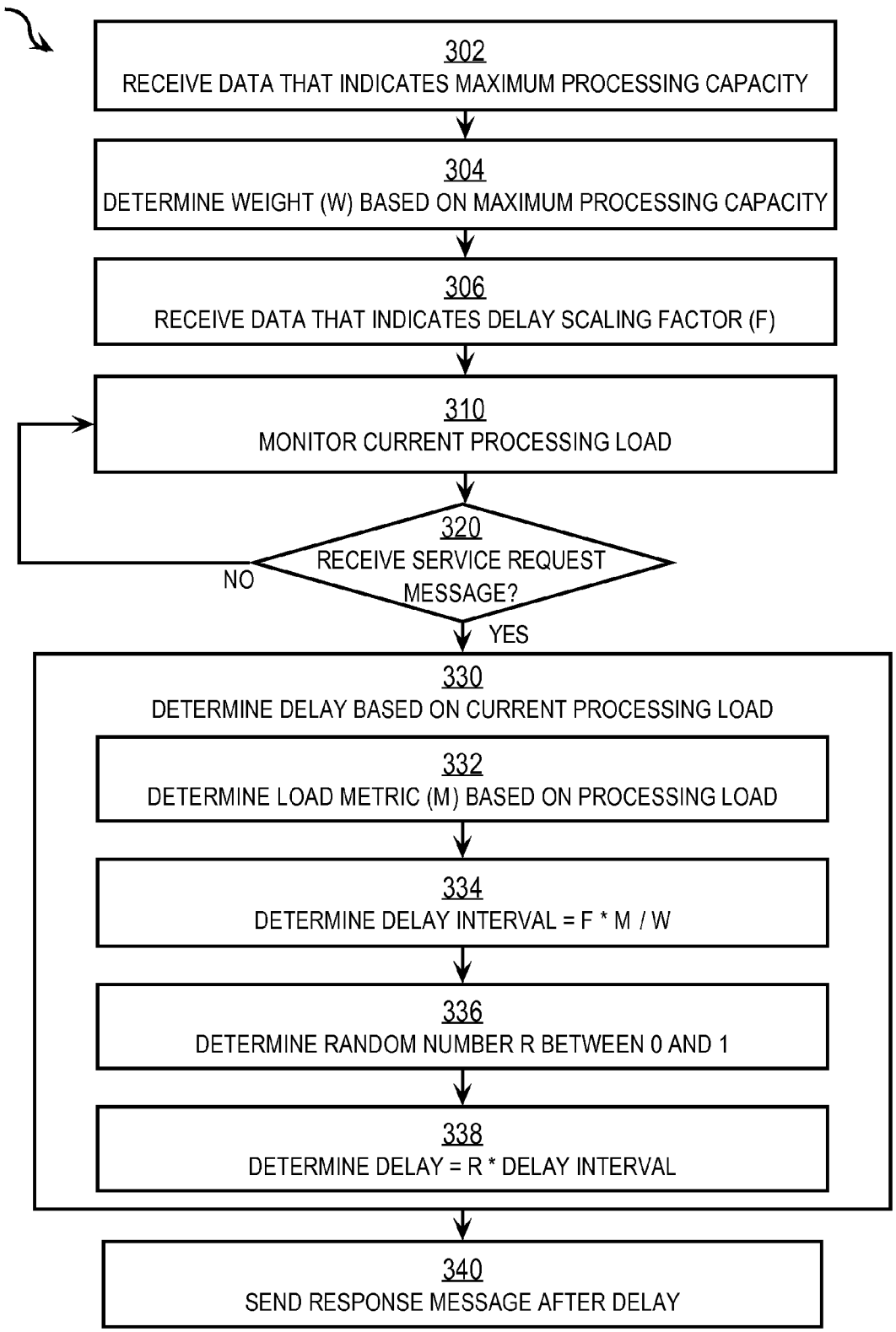
FIG. 3 illustrates an example method at a server.
Figure 4:
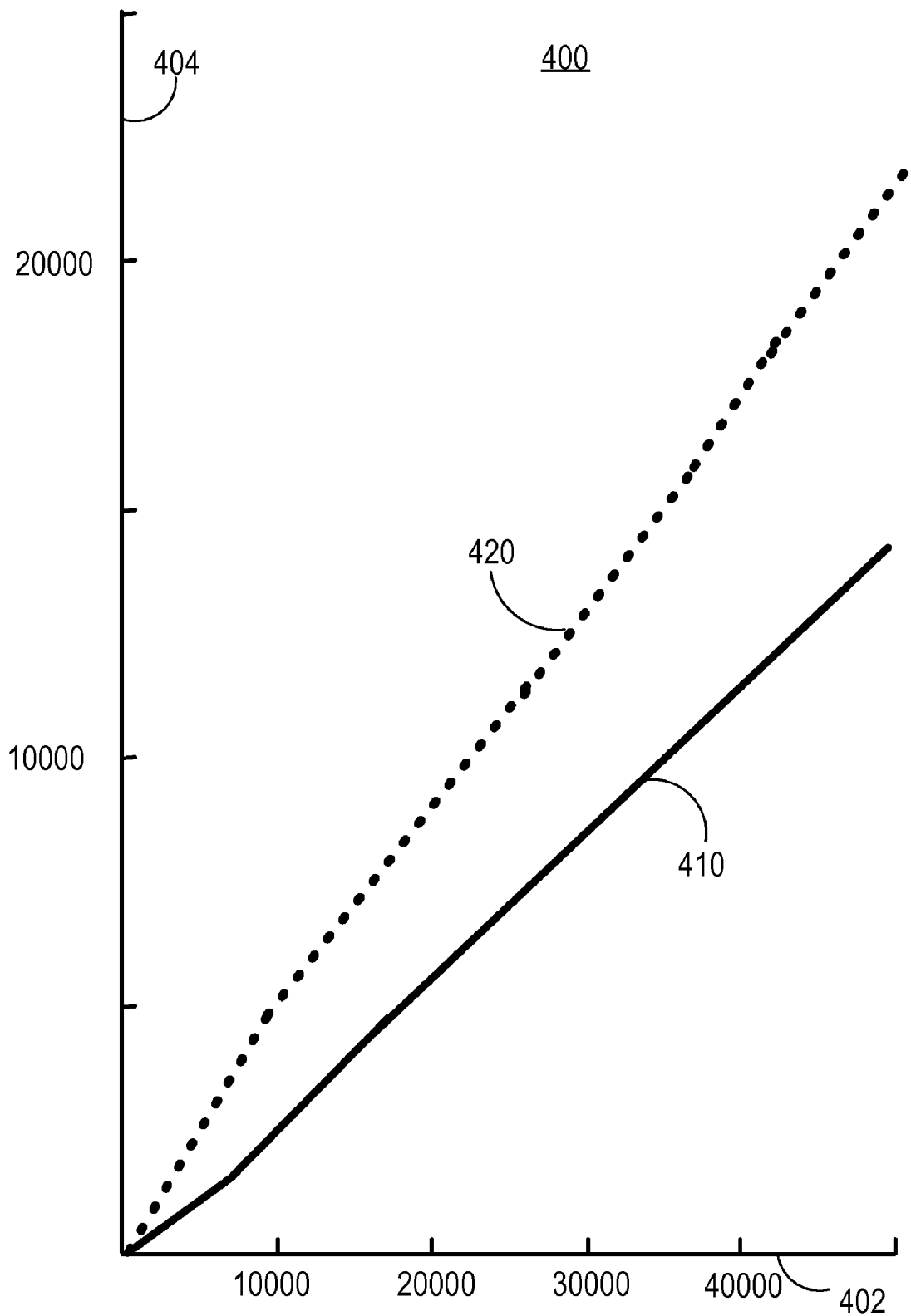
FIG. 4 illustrates example load balancing results among three servers.

The above and other embodiments are described in more detail here with reference to FIG. 3 and FIG. 4.

3.1 Independent Load Balancing at Server

FIG. 3 illustrates an example method 300 at a server for independently and fairly balancing the number of clients serviced by a host of the server. Although steps in FIG. 3 are show in a particular order for purposes of illustration, in other embodiments, one or more steps may be performed in a different order or overlapping in time, in series or in parallel, or one or more steps may be omitted or added, or changed in some combination of ways.

In step 302 data is received that indicates a processing capacity at a local node in a communications network. For example, data is received that indicates whether the local node is a BRAS host capable of 32,000 sessions or a BRAS host capable of 64,000 sessions. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods.

In step 304, a weight W is determined based on the processing capacity. Any method may be used to determine the weight W. For example, in some embodiments a table is used that assigns a weight based on a model number of a device that serves as the BRAS. It is assumed for purposes of illustration that a 32,000 session BRAS host has a weight of 1 and a 64,000 session BRAS host has a weight of 2. In some embodiments, a weight is not used, and step 302 is omitted or step 304 is omitted, or both are omitted.

In step 306, data is received that indicates a delay scaling factor (F). Again, any method may be used to receive the scaling factor F. In some embodiments, the scaling factor F is related to the maximum additional delay imposed in responding to a request for service. It is assumed for purposes of illustration that F is one second (1000 milliseconds, ms). In some embodiments, the maximum additional delay is less than or equal to the scaling factor F. In some embodiments, the maximum additional delay is greater than the scaling factor F.

In step 310, the current processing load is monitored. Any method may be used to monitor the current processing load. In some embodiments, the current processing load is measured by an operating system executing on the node that hosts the server. For example, the operating system tracks the amount of central processing unit (CPU) utilization as a percentage of total CPU capacity or the amount of memory usage, or both. In some embodiments, step 310 includes periodically querying the operating system for the current utilization rate and determining an average utilization rate. In some embodiments, the current processing load is measured by a different process executing on the node that hosts the server, such as one or more communication link processes.

In various embodiments, step 310 includes storing or requesting a value that indicates the number of current active clients for the server, such as the number of current PPPoE sessions. In some embodiments, one server instance manages the 32,000 PPPoE sessions on one BRAS and does not need to store or request a value that indicates a number of active sessions managed by another instance. In various embodiments, step 310 includes storing or requesting a value that indicates the current bandwidth used on one or more communication links at the host, such as the BRAS host.

In step 320, it is determined whether a service request message is received by the server. For example, it is determined whether the PPPoE server 220b receives a PPPoE discovery message 230b. If not, then control passes back to step 310 to continue to monitor the processing load. If so, then control passes to step 330.

In step 330, the additional delay is determined based on the current processing load. Any method may be used to determine the delay based on the current processing load. For example, the PPPoE server 220b determines the additional delay 260a based on the current processing load of the BRAS host for PPPoE server 220b. Control then passes to step 340.

In step 340, the response message is sent after the additional delay to the client that sent the request received in step 320. For example, the PPPoE offer message 231b is sent after the additional delay 260a to the PPPoE client 210 that sent the PPPoE discovery message 230b.

In the illustrated embodiment, step 330 includes step 332, step 334, step 336 and step 338.

In step 332, a load metric (M) is determined based on the current processing load. For example, a percentage of CPU usage is determined based a query to the operating system. In some embodiments, step 332 includes determining a value that indicates the current load on the host relative to a maximum load allocated on the host for the server process. For example, if 10% of the CPU is allocated for the server and 9% of the CPU is being used by the server, then the load metric is 90%. Typically, on a BRAS host, more than 90% of the CPU is allocated for the PPPoE servers.

In some embodiments, the load metric is a percentage that is not greater than 100% (equivalent to a fraction that is not greater than 1). In such embodiments, the scaling factor F is effectively the maximum additional delay time. In some embodiments, the load metric is an arbitrary number than may be greater than 1, such as the number of PPPoE sessions or the number of operations per second currently being executed by the CPU or bits per second being communicated over one or more communication links, or the result of some formula that operates on one or more measures of processing load. In such embodiments, the scaling factor F is not necessarily a maximum additional delay time.

In some embodiments the percentage or arbitrary number is some combination of multiple aspects of usage on the host computer or device.

In an illustrated embodiment, the load metric is a percentage of the maximum number of sessions allowed on the BRAS host that are currently active on that host. For purposes of illustration, it is assumed that BRAS host of PPPoE server 230b has the capacity for 64,000 sessions and currently has 32,000 active PPPoE sessions; so that the load metric determined in step 332 is 50% and the weight is 2.

In step 334, a delay interval (I) is determined based on the load metric. In the illustrated embodiment, the delay interval is determined according to Equation 1a.

$$I=F*M/W \qquad (1a)$$

where I is delay interval, F is scaling factor, M is load metric and W is weight, defined above. For the values assumed above, I=1000 ms*50%/2=250 ms. In embodiments that omit a weight W, a value of W in Equation 1a is taken to be 1; and Equation 1a reduces to Equation 1b $$I=F*M \qquad (1b)$$

In some embodiments, an interval less then a minimum interval (e.g., 1 ms) is reduced to zero milliseconds.

In some embodiments, the delay interval (I) is used as the additional delay 260a. It is assumed for purposes of illustration that BRAS host 132a and BRAS host 132b have the capacity for 32,000 PPPoE sessions, while BRAS host 132c has the greater capacity for 64,000 PPPoE sessions. Thus W=1 for BRAS host 132a and BRAS host 132b, and W=2 for BRAS host 132c. At first, none has any load and all respond immediately with zero additional delay. The PPPoE offer from the PPPoE server on the BRAS host closest to the requesting client is likely subject to the smallest round trip travel time and is most likely received first by the client and selected for the PPPoE session. As this process continues with more and more clients sending PPPoE discovery messages, each of the BRAS 132 eventually services several PPPoE sessions and adds a finite additional delay. Because of the definition of the load metric M and the weight W, the additional delay by the PPPoE server 151c on BRAS host 132c is much smaller than the additional delay of the others for the same number of sessions. At some percentages, the smaller additional delay from PPPoE server 151c on BRAS host 132c more than compensates for additional travel times to more distance PPPoE clients, and the offers from PPPoE server 151c on BRAS host 132c are more likely accepted, even for the more distant clients.

For example, it is assumed for purposes of illustration that each PPPoE server 151 is servicing 4,000 PPPoE sessions. The load metric is 12.5% for PPPoE server 151a on BRAS host 132a and PPPoE server 151b on BRAS host 132b, but the load metric is 6.25% for PPPoE server 151c on BRAS host 132c. The computed delay interval is 125 ms for PPPoE server 151a on BRAS host 132a and PPPoE server 151b on BRAS host, but is 31.25 ms for PPPoE server 151c on BRAS host 132c.

This use of the weight W encourages involvement by the more capable host even when the load metrics are identical. The incremental increase in resources to handle one more client is less on the more capable server host. For example, it is assumed for purposes of illustration that each PPPoE server 151 is servicing 10% of its capacity, e.g., the load metrics M are each 10%. Then the computed delay interval is 100 ms for PPPoE server 151a on BRAS host 132a and PPPoE server 151b on BRAS host 132b, but is 50 ms for PPPoE server 151c on BRAS host 132c. Thus the next client is more likely to be serviced by the PPPoE server 151c on the more capable BRAS host 132c. The next session represents 1/64,0000 of the capacity of the more capable host and 1/32,000 of the capacity of the less capable hosts, so it is often desirable that the more capable host take on the next client session.

In the illustrated embodiment, the delay is not equal to the delay interval selected by Equation 1a or Equation 1b. Instead, the delay is selected randomly in the delay interval. An advantage of this embodiment is to encourage load sharing by the less capable hosts, such as those that might be closer to the client. For the examples described above, when the delay interval is used as the additional delay and the weight W is used, the additional delay is 125−31.25=93.75 ms shorter for the more capable host. Thus the offer from the server on the more capable host will likely reach the client first, for two-way travel time delays up to this order. This delay is sufficient for electrical signals to cross the globe of the Earth; so, most two way travel time delays are small compared to 93 ms and the offer from the more capable client will reach the client first and most likely be selected. The resulting session formed could then be subject to unnecessarily long travel time delays.

To provide for load balancing in the long run, without requiring every new client perfectly balance the load no matter how far from a server host, it is desirable to vary the delay within the delay interval computed using Equation 1a or Equation 1b. Thus, in some embodiments, step 330 includes steps 336 and step 338.

In step 336, a random number R is determined with a value between zero and one. Any distributions of random numbers may be used. In some embodiments, a Gaussian distribution is used within the interval. In an illustrated embodiment, a uniform distribution is used in the interval from 0 to 1.

In step 338, a particular delay D is determined within the delay interval according to Equation 2a.

$$D = R*I \qquad (2)$$

where R is the random number in the interval from 0 to 1 and I is delay interval according to one of Equation 1a or Equation 1b. The additional delay, e.g., 260a, is set equal to the particular delay D.

3.2 Example Embodiment

FIG. 4 illustrates example load balancing results among three servers. FIG. 4 depicts a graph 400 with horizontal axis 402 that represents total number of PPPoE sessions in the provider aggregation network 110, and vertical axis 404 that represents number of sessions hosted by an individual BRAS 132. In this embodiment, the scaling factor is 1000 ms, the load metric M is the fraction of maximum sessions (equivalent to the percentage of maximum sessions used in examples described above). The weights are as described in the upper examples: W=1 for PPPoE server 151a on BRAS host 132a, W=1 for PPPoE server 151b on BRAS host 132b and W=2 for PPPoE server 151c on BRAS host 132c. R is selected randomly in the interval 0 to 1, distributed uniformly.

Trace 410 indicates the number of PPPoE sessions hosted by each of the less capable BRAS host 132a and BRAS host 132b; and Trace 420 indicates the number of PPPoE sessions hosted by the more capable BRAS host 132c. As can be seen, the more capable BRAS host 132c (trace 420) hosts more sessions than either of the less capable BRAS host 132a and BRAS host 132b (trace 410) at all values for the total number of sessions hosted. The traces are not simple multiples of each other because of the random term R. It is expected that, for small numbers of sessions, it is possible that the more capable host can host fewer sessions than a less capable host because of the random term R. However, for larger numbers of sessions, it becomes less probable that the more capable host will host fewer sessions than a less capable host.

Thus, fair load balancing is easily achieved without distributions by intervening nodes or negotiations among the servers. A server host is thus not overly utilized while another server host is available with excess capacity.

4.0 Implementation Mechanisms—Hardware Overview

Figure 5:
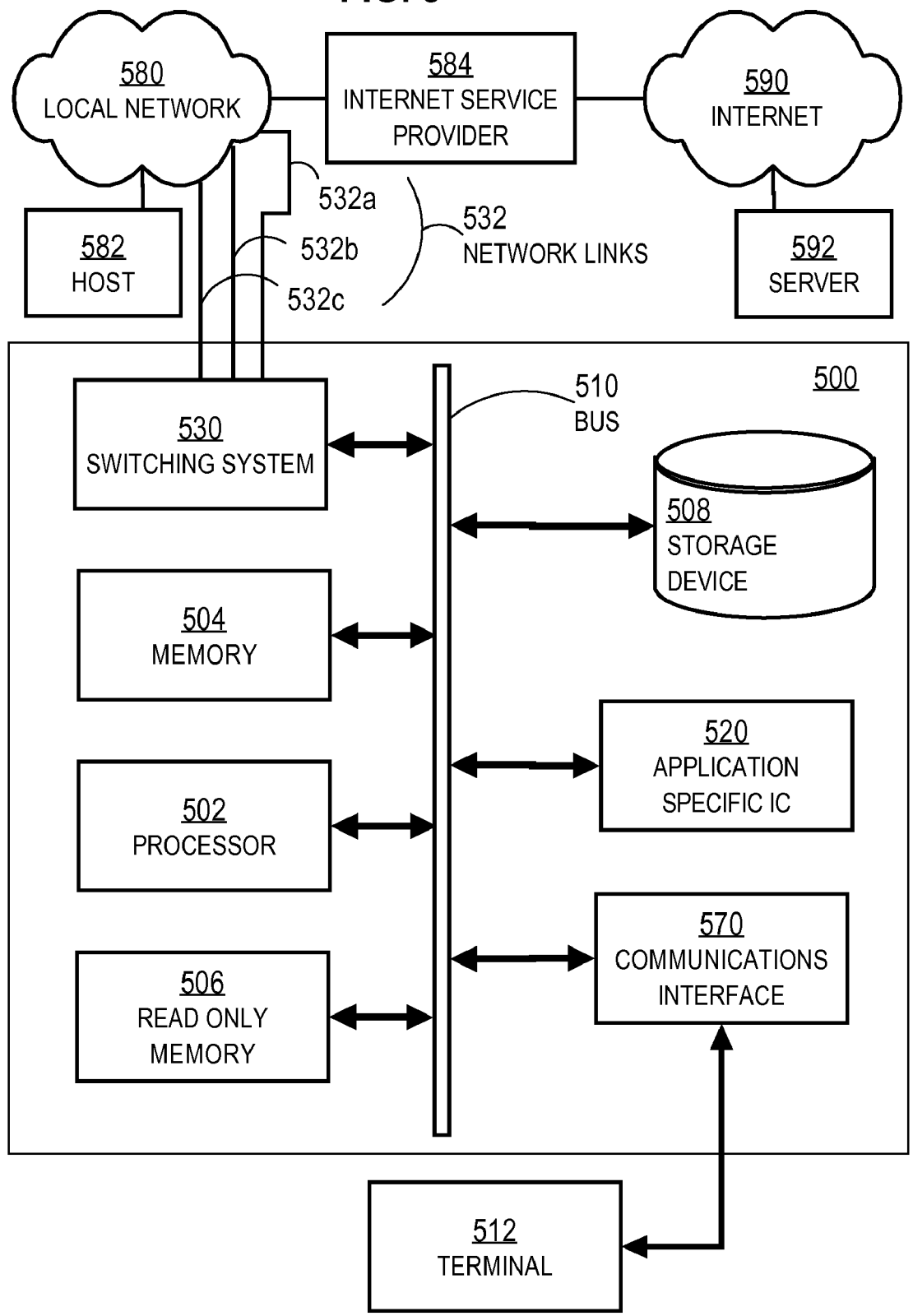
FIG. 5 illustrates a computer system upon which an embodiment of the invention may be implemented.

FIG. 5 illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made variations in amplitude, frequency, phase, polarization or other physical properties of carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532*a*, 532*b*, 532*c* are included in network links 532 in the illustrated embodiment, in other embodiments, more or fewer links are connected to switching system 530. Network links 532 typically provides information communication through one or more networks to other devices that use or process the information. For example, network link 532*b* may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532*a*, as output on the same or different network link, e.g., 532*c*. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532*a* and send it to the correct destination using output interface on link 532*c*. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted via transmission media over network link 532 and other networks through communications interfaces such as interface 570, carry information to and from computer system 500. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
receiving, at a local node in a communications network from a remote node in the communication network, a unicast request message for a particular video service, wherein the request message is associated with point-to-point protocol over Ethernet (PPPoE) exchanges involving the local node, and wherein an initial evaluation occurs for identifying a processing capacity in terms of a number of sessions that can be supported by the local node, and wherein a weight is determined for the local node based on the processing capacity;
determining a load metric that indicates a current processing load at the local node, wherein an operating system residing in the local node is configured to track central processing unit (CPU) utilization as a percentage of total CPU capacity and memory usage, and wherein the operating system is queried for a current utilization rate, which is used to determine an average utilization rate for the local node;
determining a response delay time, for responding to the request message, based on the load metric, the weight, and a scaling factor that increases the response delay time; and
sending, after the response delay time, a response message that indicates the local node is able to provide the particular service for the remote node.

2. A method as recited in claim 1, wherein:
said step of receiving the request message further comprises receiving a discovery message to discover a node to terminate a tunnel with the remote node, wherein a tunnel is a group of data packets that each include a tunnel header data field formatted according to a tunneling protocol and a payload data field to be exchanged between a source node and a destination node indicated in the tunnel header field; and
said sending the response message further comprises sending an offer message that indicates the local node is able to terminate the tunnel with the remote node.

3. A method as recited in claim 2, wherein the discover message and the offer message are formatted according to the Point-to-Point Protocol over Ethernet (PPPoE) protocol.

4. A method as recited in claim 1, said step of determining the response delay time further comprising determining a response delay time that increases with an increase in the load metric.

5. A method as recited in claim 1, said step of determining the response delay time further comprising determining the response delay time that is randomly selected within a delay interval up to a maximum delay that increases with an increase in the load metric.

6. A method as recited in claim 1, said step of determining the response delay time further comprising determining the response delay time based on a maximum processing capacity of the local node.

7. A method as recited in claim 6, said step of determining the response delay time based on the maximum processing capacity of the local node further comprising determining a response delay time that is inversely proportional to the maximum processing capacity of the local node.

8. A method as recited in claim 6, said step of determining the response delay time further comprising determining the response delay time that is randomly selected within a delay interval up to a maximum delay that is inversely proportional to the maximum processing capacity of the local node.

9. An apparatus, comprising:
means for receiving, from a remote node in a communication network, a unicast request message for a particular video service, wherein the request message is associated with point-to-point protocol over Ethernet (PPPoE) exchanges involving the apparatus, and wherein an initial evaluation occurs for identifying a processing capacity in terms of a number of sessions that can be supported by the apparatus, and wherein a weight is determined for the apparatus based on the processing capacity;
means for determining a load metric that indicates a current processing load at the apparatus, wherein an operating system residing in the apparatus is configured to track central processing unit (CPU) utilization as a percentage of total CPU capacity and memory usage, and wherein the operating system is queried for a current utilization rate, which is used to determine an average utilization rate for the apparatus;

means for determining a response delay time, for responding to the request message, based on the load metric, the weight, and a scaling factor that increases the response delay time; and means for sending, after the response delay time, a response message that indicates the apparatus is able to provide the particular service for the remote node.

10. An apparatus as recited in claim 9, wherein:

said means for receiving the request message further comprises means for receiving a discovery message to discover a node to terminate a tunnel with the remote node, wherein a tunnel is a group of data packets that each include a tunnel header data field formatted according to a tunneling protocol and a payload data field to be exchanged between a source node and a destination node indicated in the tunnel header field; and said means for sending the response message further comprises means for sending an offer message that indicates the apparatus is able to terminate the tunnel with the remote node.

11. An apparatus as recited in claim 9, said means for determining the response delay time further comprising means for determining a response delay time that increases with an increase in the load metric.

12. An apparatus as recited in claim 9, said means for determining the response delay time further comprising means for determining the response delay time that is randomly selected within a delay interval up to a maximum delay that increases with an increase in the load metric.

13. An apparatus comprising:

a network interface that is configured for communicating a data packet with a packet-switched network;

logic encoded in one or more tangible media for execution and, when executed, operable for:

receiving, from a remote node in the packet-switched network, a unicast request message for a particular video service, wherein the request message is associated with point-to-point protocol over Ethernet (PPPoE) exchanges involving the apparatus, and wherein an initial evaluation occurs for identifying a processing capacity in terms of a number of sessions that can be supported by the apparatus, and wherein a weight is determined for the apparatus based on the processing capacity;

determining a load metric that indicates a current processing load at the apparatus, wherein an operating system residing in the apparatus is configured to track central processing unit (CPU) utilization as a percentage of total CPU capacity and memory usage, and wherein the operating system is queried for a current utilization rate, which is used to determine an average utilization rate for the apparatus;

determining a response delay time, for responding to the request message, based on the load metric, the weight, and a scaling factor that increases the response delay time; and sending, after the response delay time, a response message that indicates the apparatus is able to provide the particular service for the remote node.

14. An apparatus as recited in claim 13, wherein:

said receiving the request message further comprises receiving a discovery message to discover a node to terminate a tunnel with the remote node, wherein a tunnel is a group of data packets that each include a tunnel header data field formatted according to a tunneling protocol and a payload data field to be exchanged between a source node and a destination node indicated in the tunnel header field; and said sending the response message further comprises sending an offer message that indicates the local node is able to terminate the tunnel with the remote node.

15. An apparatus as recited in claim 14, wherein the discover message and the offer message are formatted according to the Point-to-Point Protocol over Ethernet (PPPoE) protocol.

16. An apparatus as recited in claim 13, said determining the response delay time further comprising determining a response delay time that increases with an increase in the load metric.

17. An apparatus as recited in claim 13, said determining the response delay time further comprising determining the response delay time that is randomly selected within a delay interval up to a maximum delay that increases with an increase in the load metric.

18. An apparatus as recited in claim 13, said determining the response delay time further comprising determining the response delay time based on a maximum processing capacity of the local node.

19. An apparatus as recited in claim 18, said determining the response delay time based on the maximum processing capacity of the local node further comprising determining a response delay time that is inversely proportional to the maximum processing capacity of the local node.

20. An apparatus as recited in claim 18, said determining the response delay time further comprising determining the response delay time that is randomly selected within a delay interval up to a maximum delay that is inversely proportional to the maximum processing capacity of the local node.

* * * * *